United States Patent Office 2,722,504
Patented Nov. 1, 1955

2,722,504

SILICONE COATED CATALYST AND USE THEREOF

Raymond N. Fleck, Long Beach, Calif., assignor to Union Oil Company of California, Los Angeles, Calif., a corporation of California No Drawing. Application December 4, 1950, Serial No. 199,158

9 Claims. (Cl. 196—52)

This invention relates broadly to methods for improving the contacting efficiency of solid contacting materials such as adsorbents, catalysts, heat transfer agents, ion exchange contacts and the like. More particularly this invention relates to methods for incorporating silicones into solid contacting materials whereby their contacting efficiency is improved and to methods for using the treated contacts obtained thereby.

The solid contacting materials employed in the petroleum processing industry are generally of the metal oxide type or metal sulfide type and such contacts are substantially hydrophilic, i. e., organophobic, in nature. The hydrophilic nature of a catalyst carrier, for example, restricts the wetting of the catalyst surface with the hydrocarbon being processed and it has been found that such nature decreases the potential conversion over that which might be obtained with carriers having substantially an organophilic surface. The common organophilic catalyst carrier which is of commercial importance is activated charcoal. This carrier would possibly find more widespread usage were it not for the outstanding disadvantage in that it is non-regenerable by oxidation at high temperatures.

It has been found that adsorbents are limited in their application for the adsorption and the adsorptive separation of hydrocarbons by the degree of their organophilic nature. The presently employed adsorbents are either of the strong organophilic types such as charcoal, or of the strong organophobic types such as silica gel, alumina gel and the like. No suitable method exists for progressively altering the character of the surface to correspond to any particular degree of adsorbent specificity. The characteristics of the two extreme types of adsorbents is readily demonstrated by shaking a mixture of water and benzene with a mixed adsorbent comprising silica gel and charcoal, wherein it is found that the silica gel is selectively wetted by the water and the charcoal is selectively wetted by the benzene. A continuous spectrum of the surface characteristics of adsorbents permits preparation of adsorbents which have increased specificity for adsorption of benzene from methylcyclopentane for example.

The transfer of heat between a solid heat transfer agent and hydrocarbon fluids, both liquid and gaseous, is also improved by the incorporation of silicones into the solid agent. The ability of ion exchange contacts to replace anions or cations in a hydrocarbon liquid is improved by the incorporation of silicones in the contacts.

It is an object of this invention to prepare and use solid contacting materials which comprise a relatively organophobic supporting material and a silicone wherein the silicone at least partially makes up or is present on the surface of the contacting material and renders the surface relatively organophilic.

It is, therefore, an object of this invention to incorporate silicone polymers in solid contacting materials wherein the silicone is prepared in contact with or on the surface of the contacting material or a portion thereof.

It is another object of this invention to coat a solid contacting material such as a catalyst, a catalyst carrier, or adsorbent, an ion-exchange contact, a heat transfer agent, or the like, with a thin layer of a silicone polymer in order to increase the organophilic character of the contact surface.

It is another object of this invention to incorporate a silicone polymer onto or within the physical structure of a solid contacting material in order to increase the organophilic character of the surface thereof and to increase the physical strength and thermal stability.

It is another object of this invention to prepare hydrocarbon conversion catalysts of the supported metal oxide type or metal sulfide type, wherein a silicone is prepared in contact with the surface of the carrier or catalyst or is incorporated in the physical structure of the carrier during the preparation of the latter.

It is another object of this invention to employ silicone containing catalysts in hydrocarbon conversion reactions whereby the presence of the silicone on the catalyst or carrier surface or in the physical structure of the catalyst serves to increase the contacting efficiency and selectivity of the catalyst for promoting certain desirable hydrocarbon conversions.

It is another object of this invention to increase the yield of hydrogen while simultaneously decreasing the yield of low boiling hydrocarbons during catalytic dehydrogenation of hydrocarbon containing stocks.

It is another object of this invention to employ silicone coated or silicone incorporated ion-exchange contacts.

It is another object of this invention to prepare organophilic solid contacting materials which are regenerable by oxidation at elevated temperatures.

It is another object of this invention to provide silicone containing catalysts for desulfurizing hydrocarbons.

It is another object of this invention to provide silicone containing catalysts for catalytic reforming of hydrocarbon stocks.

It is another object of this invention to provide absorbents which are highly specific for the adsorption of and/or separation of hydrocarbon gases and liquids.

Other objects and advantages of this invention will become apparent to those skilled in the art as the description hereof proceeds.

Briefly this invention relates to the incorporation of silicones in solid contacting materials such as catalysts, adsorbents, ion-exchange contacts, heat transfer agents and the like. It has been found that the efficiency of such contacts is markedly increased by the inclusion of minor amounts of silicones such as of the order of 0.001% to 5% and preferably between about 0.01% and 2% when the silicone is calculated as silicon, i. e., Si. In general the silicone is prepared by hydrolysis in situ of silicone forming agents, such as alkyl silicon halides, aryl silicon halides, alkyl-aryl silicon halides, aryl-alkyl silicon halides and the like. Alternatively, the silicone forming agent may be any of the esters derivable from the foregoing silicon halides such as alkyl alkoxy silicon halides, aryl alkoxy silicon halides, aryl-alkyl alkoxy silicon halides, alkyl-aryl alkoxy silicon halides and the like. Similarly the alkoxy derivatives of the foregoing list may be replaced by the corresponding phenoxy derivatives. Other silicone forming agents may be employed such as organo-silicon compounds containing at least one carbon-silicon bond. Thus such derivatives as dimethyl silane $(CH_3)_2SiH_2$ may be employed since upon hydrolysis the compound retains the two carbon-silicon bonds intact.

The silicone may be incorporated into the solid contacting material and carriers therefor in a number of ways. Where the primary function of the silicone is to create organophilic surfaces, the silicone forming agent may be deposited on the surface of the contacting material and subsequently hydrolyzed in situ to form a firmly bonded layer of silicone thereon. Where the contacting material is a carrier for a catalyst the silicone may be formed on the surface of the carrier either before or after inclusion of the catalytically active material, e. g., a metal oxide or metal sulfide. Placement of the silicone forming agent on the surface may be accomplished by vapor phase adsorption, impregnation, soaking, or the like. Where impregnation is employed the pure silicone forming agent may be employed, but is preferably diluted with a suitable solvent. Where the solid is only slightly adsorptive or non-adsorptive, the solid may be immersed in a silicone forming agent or solution thereof and the part thereof retained on draining is hydrolyzed to form the coating. The hydrolysis may be affected by the traces of water normally retained on the adsorptive surface of the carrier. Generally however, additional water is supplied therefor by impregnation, vapor phase adsorption, immersion, or the like.

In yet another modification for incorporating the silicone into the solid contacting material, the silicone forming agent may be hydrolyzed in the presence of a hydrogel of the solid contact, which may be a catalyst carrier for example, and intimately dispersed therewith. Subsequently the carrier containing the precipitated silicone is dried and activated in a conventional manner. In one modification for the preparation of catalysts, the hydrogel of a catalytically active metal oxide is co-precipitated and mixed with the hydrogel of the carrier, and the silicone forming agent is hydrolyzed in the presence of both hydrogels.

Certain silicone forming agents form somewhat stable intermediate hydrolysis products such as silanols, silane-diols and silane-triols. Where such compounds are stable they may be incorporated in hydrogels or they may be deposited on contacting materials and dehydrated in situ to form firmly bonded silicones.

The term "silicone" or "silicone polymer" is used herein to denote a class of organo-silicon compounds which have been developed commercially during recent years. The characteristic linkage of the silicones comprises an alternating linkage between silicon and oxygen atoms. The silicon atom has four valence bonds. One, two or three of the valence bonds of each silicon atom in a silicone is or are attached to oxygen atoms and the remaining three, two or one bonds respectively, are or is attached to alkyl or aryl radicals, for example.

Silicones are prepared by hydrolyzing such compounds as mono-alkyl silicon halides, di-alkyl silicon halides, tri-alkyl silicon halides, mono-aryl silicon halides, di-aryl silicon halides, tri-aryl silicon halides or mixtures thereof. Mixed aryl and alkyl di- or tri-substituted silicon halides may also be employed.

The hydrolysis of these halides to form silicones is effected by treating the compound with one mole of water, or water vapor, per gram atom of halogen to be hydrolyzed and preferably with about one to ten times this amount. The hydrolysis is carried out at atmospheric or elevated pressure as desired and at temperatures above 25° C. The hydrolysis of substituted silicon halides containing less than 10 carbon atoms per molecule is rapid and complete at 25° C. and atmospheric pressure. The higher molecular weight halides often require heat and/or pressure to complete the hydrolysis of the silicon halide and effect subsequent condensation.

The substituted silicon halides are prepared by reacting a silicon halide or a substituted silicon halide with the appropriate Grignard reagent according to the following reactions:

(1) $SiX_4 + R_1MgX \rightarrow R_1SiX_3 + MgX_2$
(2) $R_1SiX_3 + R_2MgX \rightarrow R_1R_2SiX_2 + MgX_2$
(3) $R_1R_2SiX_2 + R_3MgX \rightarrow R_1R_2R_3SiX + MgX_2$ In the above sequence of reactions the radicals $R_1$, $R_2$ and $R_3$ are alkyl, aryl, alkyl-aryl, and/or aryl-alkyl radicals as desired and X is selected from the class of iodine, bromine, and chlorine, whichever is suitable and convenient for the preparation of the desired Grignard reagent.

An alternative method for the preparation of silicone polymers involves the reaction of any of the aforedescribed substituted silicon halides with an alcohol such as methanol, ethanol, propanol and the like to form the corresponding ester and the subsequent hydrolysis of the ester to form the alcohol, and the silicone. The intermediate esters may be advantageously employed in those cases where the direct hydrolysis of the silicon halide itself would be too violent.

Silicone-forming agents are characterized by the formula $$R_1R_2R_3SiX$$

wherein $R_1$ is a non-hydrolyzable group, $R_2$ and $R_3$ each represents a group selected from the class consisting of hydrolyzable and non-hydrolyzable groups, and X is a hydrolyzable group.

With reference to this formula, hydrolyzable and non-hydrolyzable are terms which relate to the separability or non-separability of the group from its bond with the silicon atom upon treatment with water.

Hydrolyzable groups include halogens, alkoxy and other groups which are separated from the silicon atom on treatment with water. The alkoxy group is of the form —OR' and this may be methoxy, ethoxy, propoxy, butoxy, phenoxy, methyl phenoxy, phenyl methoxy or any other alkoxy radical derivable from an alcohol. Preferably the alcohols have less than about 10 carbon atoms to facilitate the hydrolysis of the alkoxy silicon compound. In certain cases the hydrolyzable group may be a group such as nitro, amino, hydroxyl, mercapto and the like.

Non-hydrolyzable groups include organic radicals wherein a carbon atom of the group is attached to the silicon atom. The non-hydrolyzable group remains attached to the silicon atom after hydrolysis and formation of the silicone. The non-hydrolyzable group is generally selected from the class consisting of alkyl, aryl, aryl-alkyl, alkyl-aryl. In certain cases these organic groups may themselves be substituted with halogens. In some cases these organic groups may be substituted with nitro, amino, mercapto, sulfonic acid, hydroxyl, keto, carboxyl and other such groups. Preferably, the hydrolyzable group contains less than about 20 carbon atoms.

The silicon atom of the silicone-forming agent may be mono-, di-, or tri-substituted with non-hydrolyzable groups so as to form silicones having one, two, or three radicals attached to the silicon atom. Mixed silicones can be prepared from mixtures of the three general types of agents.

The type of silicone-forming agent to be employed in the preparation of the solid contacting material depends to a considerable extent on the use to which the material will be put. Ethyl and particularly methyl silicones are very resistant to destruction by oxidation and these silicones are generally favored where the surface is to be periodically oxidized. Phenyl silicones are also useful for this purpose. Where the surface is only occasionally oxidized, if ever, other silicones may be formed on the surface. For this usage hydrocarbon radicals having between about 1 and 20 carbon atoms each may be employed, such as propyl, isopropyl, butyl, isobutyl, amyl, hexyl, heptyl, phenyl, decyl, hexadecyl, methyl phenyl, dimethyl phenyl, naphthyl, methyl naphthyl, cyclohexyl, cyclohexyl methyl, diphenyl, and the like. Halogenated hydrocarbon radicals are more resistant to oxidation and also render the surface organophilic. Thus chloromethyl, bromo-methyl, dichloro-methyl, trichloro-methyl, bromphenyl, dibrom phenyl, penta-chlorophenyl, penta-bromo phenyl, bromnaphthyl, chloro naphthyl silicones and the like may be formed and incorporated in the solid contents. In certain cases the character of the organophilic coating may be further modified by including various substituents on the hydrocarbon radicals of the silicones such as nitro, sulfonic, amino, hydroxyl, keto, mercapto, carboxyl and the like. Such groups are often partially destructible and removable by oxidation and are therefore most generally employed where the contact is not subjected to oxidation.

The hydrocarbon radicals and halogenated hydrocarbon radicals are the preferred non-hydrolyzable groups for silicones. However in certain cases other organic radicals may be employed such as pyridyl, methyl pyridyl, quinolyl, thienyl, benzothienyl, furanyl, furfuryl and the like. Thus 2-pyridyl silicon trichloride, 2-quinolyl silicon tri-bromide, 3-thienyl silicon tri-bromide and the like may be employed as silicone-forming agents for example.

Various amounts of silicones may be incorporated into a solid contacting agent. Usually between about 0.0001% and 5% by weight is employed and preferably between about 0.01% and 2% by weight of silicone is employed when calculated on the basis of the silicon, i. e., per cent by weight of Si.

In preparing catalysts and catalyst carriers by the coating method the carrier with or without the added catalytic agents is subjected to adsorption or impregnation of a silicone-forming agent. In the case where low molecular weight silicone-forming agents are employed, adsorption from the gaseous phase is generally preferable. Thus if it is desired to prepare methyl or ethyl silicones on the surface of a carrier, methyl silicon halides such as monomethyl, dimethyl or trimethyl silicon halides or monoethyl, diethyl or triethyl silicon halides or mixtures thereof may be employed. The carrier or catalyst is preferably desorbed by heating at an elevated temperature with or without the reduction of pressure below atmospheric pressure. The desorbed carrier is then contacted with a gaseous phase containing the silicone-forming agent whereupon a portion of the agent is adsorbed. Following the adsorption of the silicone-forming agent, the carrier is then contacted with water vapor or with liquid water which causes an immediate hydrolysis of the silicone-forming agent with the resulting formation of a tightly bonded layer of silicone on the surface of the carrier. Where the carrier is coated prior to deposition of a metal oxide or active ingredient, the metal oxide may be incorporated on the treated carrier by conventional methods, e. g., impregnation. The silicone-coated carrier is usually heated to an activation temperature such as in the range of about 800° F. to 1200° F., for example, and thereafter impregnated with the catalytic agent such as molybdenum and the like.

In yet another method for coating carriers the silicone-forming agent may be dissolved in a suitable solvent and impregnated on the carrier and subsequently hydrolyzed to form a bonded silicone layer. The silicone forming agent may, for example, be dissolved in low molecular weight solvents such as acetone, methyl ethyl ketone, ethyl alcohol, isopropyl alcohol, pyridine, dioxane, and the like to form a solution thereof. The concentration of the silicone-forming agent solution is adjusted to give the desired concentration of silicone coating. In general the carrier adsorbs about 0.4 to 0.5 ml. of solution per gram of carrier and the required concentration is usually calculated on this basis. The carrier, preferably after activation at elevated temperature, is immersed in the impregnation solution and allowed to soak for a suitable period of time such as ten minutes to one hour, for example, drained, dried and contacted with water such as by immersion in liquid water. Following the water treatment, the carrier is again activated by heating at elevated temperatures whereupon it is in suitable condition for subsequent impregnation with catalytic agents. Where the metal oxide, metal sulfide or other agent has been deposited prior to silicone coating, the material is then ready for catalytic usage.

In yet another method for incorporating the silicone into a catalyst carrier, the carrier may be intimately mixed with the silicone-forming agent while in the hydrogel state. Alumina or silica gel, for example, is prepared in the hydrogel state such as by precipitation of aluminum nitrate with ammonia or by precipitation of sodium aluminate or sodium silicate with carbon dioxide and the resulting hydrogel, preferably after extensive water washing, under vigorous agitation, is contacted with a silicone-forming agent which is hydrolyzed in the aqueous medium to form an intimate dispersion of silicone within the hydrogel. The silicone-forming agent is added to the aqueous suspension of the hydrogel while in solution in a suitable solvent such as one of those described hereinbefore. The use of a solvent for a silicone-forming agent increases the degree and intimacy of the dispersion and bonding.

When it is desired to form a silicone in the presence of the mixed hydrogels of both the carrier and catalytic agent, this is accomplished in substantially the same manner as for the case described hereinbefore wherein the active catalytic agent hydrogel is not present.

After the dispersion of the silicone the hydrogel is filtered from the aqueous suspension, dried and formed according to conventional methods. The dried, treated hydrogel is subjected to activation at elevated temperatures prior to usage or prior to a subsequent impregnation.

Numerous catalytic carriers are employed for catalytic processing and these generally may be employed for preparing catalysts of this invention. Such carriers are normally semi-porous, heat resistant, adsorptive solids which are characterized by their high surface area per unit weight. Alumina, silica, magnesia, zirconia, thoria, titania, magnesium hydroxide, combinations of these, and the like may be employed, for example.

The preferred carrier is activated, gel-type alumina. Alumina gels containing between about 1% and 15% and preferably between about 3% and 8% of coprecipitated silica are especially suitable carriers. The presence of the small amount of silica in the alumina serves to stabilize the resulting catalyst and prolongs the catalyst life as is described in U. S. Patent 2,437,532.

Prior to the impregnation steps, the carrier is normally shaped into the physical form desired for the catalyst. For this purpose the dried carrier is usually ground, mixed with a lubricant such as graphite or hydrogenated vegetable oil, and pilled. In the activation of the carrier the lubricant is removed by combustion. Alternatively, the carrier may be used in granular form; or it may be ground into powder, made into a paste and extruded. Where the catalyst is to be employed in a fluidized process, such as in fluidized desulfurization, denitrogenation, and the like, the carrier is formed into a finely divided state as in micro-bead form, or it is ground into a fine state and is thereafter impregnated. In the case of fluidized processes the carrier can be impregnated in larger form, e. g. granules, pills, etc., and thereafter ground to the desired powder size for the processing.

In the preparation of the carrier for either the initial or a subsequent impregnation, and either before or after silicone treatment, the carrier is activated by heating in order to render it sufficiently adsorbent for the impregnation. This activation may, for example, be effected by heating for 2 to 6 hours at 800° F. to 1200° F. The carrier is then cooled and immersed in the impregnation solution. The impregnation solution is adsorbed by the carrier and the excess solution is thereafter removed. The impregnated carrier is drained and dried in a low temperature oven to remove the bulk of the water. Following the drying at, for example, 180° F. to 230° F., the mixture is activated by heating it to a temperature of, for example, 800° F. to 1200° F. for two to six hours.

In certain cases the solid contacting material may be coated with a silicone while in a finely divided state such as a powder and after silicone treating formed into larger pills, tablets, etc. It is usually preferable to treat the finally shaped particle with the silicone since the physical strength is generally increased by the silicone coating.

Catalytic agents, which may be employed in the catalysts of this invention, include the oxides, sulfides, or other compounds of metals such as chromium, molybdenum, cobalt, nickel, zinc, iron, lead, beryllium, cadmium, vanadium, manganese, tantalum, tungsten, titanium, platinum, columbium, scandium, thorium, aluminum, uranium, zirconium, tin, copper, etc., or combinations of two or more of such compounds.

Of these catalytic agents those which appear to be most effective and consequently find the greatest usage are the compounds of the transitional metals of atomic No. 22 to 42 including titanium, vanadium, chromium, manganese, iron, cobalt, nickel, copper, zinc, yttrium, zirconium, columbium and molybdenum. For example, in the processes of hydroforming and aromatization such metal oxides as molybdenum oxide, chromium oxide, vanadium oxide, copper oxide, or the like when distended either individually or in combination on a suitable carrier such as alumina are excellent catalysts for the specific reactions necessary to these processes. Also in dehydrogenation of hydrocarbons catalytic agents such as the oxides of chromium, tungsten, iron, nickel or nickel are normally employed. The oxides of nickel, copper and iron are also employed, distended on suitable carriers, to catalyze hydrogenation reactions. For the desulfurization of hydrocarbons, a process which involves largely hydrogenation, the oxides and sulfides of such metals as cobalt, molybdenum, chromium, iron, manganese, vanadium, copper and mixtures thereof have found widespread usage as catalytic agents.

The catalytic agents may be deposited before, during, or after the inclusion of the silicone. Impregnation is a simple method for preparing the catalysts and can be used to impregnate either treated or untreated carriers. Where the untreated carrier is impregnated, the resulting catalyst is thereafter treated to deposit the silicone. Where impregnation is employed the adsorptive carrier is immersed in a solution which is generally an aqueous or ammoniacal solution of water-soluble or ammonia-soluble salts of the element or elements to be employed as the catalytic agent.

In other cases the catalytic agent may be coprecipitated with the carrier and with or without the simultaneous deposition of the silicone. Where coprecipitation is employed to incorporate the catalytic agent in the carrier, it is usually preferable to dry the mixture of catalytic agent and carrier and thereafter deposit the silicone on the solid exterior of the surface by impregnation plus hydrolysis or by adsorption plus hydrolysis.

A wide range of concentration of the catalytic agent may be employed generally. In the case of the heavy metals which are relatively expensive, it is economically desirable to not employ unsupported catalyst but to employ the catalytic agent on a suitable support or carrier. The catalytic agent is preferably between about 5% and 25% by weight of the solid contacting material for best results considering both cost and activity.

The finished catalyst is useful for effecting various hydrocarbon conversion reactions such as isomerization, desulfurization, denitrogenation, hydrogenation, hydroforming, reforming hydrocracking, destructive hydrogenation and the like.

Such reactions are carried out in the presence of hydrogen at temperatures between about 500° F. and 1500° F., for example, and especially at temperatures between about 600° F. and 1200° F.

During usage varying amounts of deposits, comprising mostly carbon, nitrogen and sulfur compounds, accumulate on the catalyst surface and are periodically removed by regeneration. Regeneration of the metal oxide type catalysts is effected by passing air diluted with flue gas, steam, nitrogen or other inert gas over the catalyst to combust the deposits while maintaining the temperature of the catalyst between 800° F. and 1200° F. The combustion is completed in the presence of undiluted air while maintaining the temperature of the catalyst between 800° F. and 1200° F. The regenerated catalyst after reduction with hydrogen may be re-employed for hydrocarbon conversion catalysis. It is preferable to employ methyl, ethyl, and phenyl silicones and halogenated derivatives thereof where successive regenerations are to be employed since such surfaces are most resistant to oxidation.

For the purpose of desulfurizing petroleum stocks, shale distillates and the like, the catalysts of this invention are preferably employed under the following conditions: reaction temperatures between about 600° F. to 1000° F., pressures between about atmospheric and 5000 lbs. per sq. in. or more and at liquid hourly space velocities between about 0.2 and 50.0 volumes of liquid feed stock per volume of catalyst per hour, and 50 to 10,000 cu. ft. of added hydrogen per barrel of feed. The particular set of conditions within these ranges is determined by the stock to be desulfurized and by the nature of the product desired.

The catalysts of this invention can also be employed for denitrogenation of such stocks as coal tar distillate, shale oils and heavy petroleum distillates whereby up to 99% of the nitrogen and substantially 100% of the sulfur can be removed simultaneously. For denitrogenation of such stocks the following conditions are preferably employed: reaction temperatures between about 700° F. and 1000° F., pressures between about 50 and 10,000 lbs. per sq. in., feed rates between about 0.2 and 10.0 volumes of liquid feed stock per volume of catalyst per hour, and about 500 to 10,000 cu. ft. of added hydrogen per barrel of feed. For the removal of nitrogen it is often desirable to employ a two-stage denitrogenation process wherein the ammonia synthesized in the first stage is removed from the first-stage product prior to its entry into the second stage denitrogenation and wherein the ammonia and hydrogen sulfide are removed from the recycle hydrogen gas streams in each stage. Under these conditions the maximum efficiency for removing nitrogen from the stocks is obtained.

The catalysts of this invention may also be employed for the reforming processes such as for that reforming process which is generally termed 'hydroforming." This process serves to reform a gasoline range hydrocarbon stock and increase its aromatic content and improve its octane rating. For processing stocks for the purpose of reforming and increasing their aromaticity, the following conditions are preferably employed: reaction temperatures between about 700° F. and 1200° F., pressures between about 50 to 1,000 lbs. per sq. in., liquid hourly space velocities between about 0.2 and 4.0 volumes of liquid feed stock per volume of catalyst per hour, and about 1,000 to 10,000 cu. ft. of added hydrogen per barrel of feed. The specific conditions are determined by the nature of the specific feed stock employed and the quality of the product desired.

The foregoing methods for the inclusion of silicones in catlysts and catalyst carriers are equally applicable for the preparation of other solid contacts.

Adsorbents can be treated with silicones by either coprecipitating the adsorbent in the presence of a silicone-forming agent or by depositing a silicone-forming agent on the adsorbent surface and in either case hydrolyzing the silicone-forming agent in situ. Thus, for example, silica gel, alumina gel, titania gel, and the like may be coprecipitated with silicones by employing conventional precipitation methods for precipitation of the gel and by adding a silicone-forming agent to the rapidly stirred solution for example.

Alternatively, adsorbents such as alumina, silica, titania, activated carbon and the like, can be coated using the methods described hereinbefore for catalyst carriers.

Where silicones are incorporated in adsorbents of this invention, the treated adsorbents show improved efficiencies when they are employed for the adsorption of liquid hydrocarbons, hydrocarbon vapors, hydrogen and the like. The treated adsorbents of this invention may be employed in any of the conventional decolorizing and separation processes. The treated adsorbents show a sharper separation when they are employed to separate liquid hydrocarbons such as to separate aromatics from naphthenes, to separate naphthenes from paraffins and the like. It has also been found that the relative adsorbability of one hydrocarbon over another hydrocarbon can sometimes be reversed by controlling the quantity and type of silicone deposited on the adsorbent surface.

In the use of the adsorbents of this invention the adsorbent is contacted with a fluid, such as a hydrocarbon liquid or gas, and the more readily adsorbable constituents of said fluid are adsorbed thereon. The adsorbent containing adsorbed constituents is then separated from the less readily adsorbable, non-adsorbed, constituents. The adsorbed constituents are separated from the adsorbent by heating, stripping with steam or liquids or the like. The process may be continuous or batchwise and concurrent or countercurrent.

Other solid contacts can be prepared by coating conventional contacts by the process of this invention in order to improve their wettability.

Perhaps the invention can best be understood by reference to the following specific examples:

Example I

A treated alumina gel and an untreated alumina gel are prepared from a hydrous aluminum hydroxide gel containing substantially 90% water and 10% aluminum trioxide hydrated as follows: About 41 parts by weight of trimethyl ethoxy silane is dissolved in about 500 parts by weight of acetone. The acetone solution is added to a slurry about 5000 parts by weight of the hydrous gel while the slurry is vigorously stirred. There occurs a rapid hydrolysis of the tri-methyl ethoxy silane to form various hydrolytic products which are retained by the hydrous gel. The treated gel is filtered, washed free of acetone, and dried in a low temperature oven. The treated gel is dried and activated by heating to about 1100° F. for about 2 hours. The untreated gel is prepared by filtering a second portion of the hydrous gel, drying, and heating to about 1100° F. for 2 hours.

The silicone-treated and the untreated carriers are then separately impregnated with molybdenum oxide as follows: A solution of about 52 parts by weight of ammonium parmolybdate (assaying about 81% by weight of MoO₃) in about 18 parts by weight of 28% aqueous ammonia and 216 parts by weight of distilled water is prepared. About 200 parts by weight of the carrier is immersed in the solution for a period of about 30 minutes. In each case the impregnated carrier is drained, dried and finally activated by heating at about 1100° F. for two hours.

The two catalysts are evaluated for hydroforming activity by the hydroforming of a straight run naphthene-rich petroleum fraction boiling in the range between about 200° and 260° F. The production of toluene is used as the index of activity. The test conditions employed are as follows:

| | |
|---|---|
| Temperature, ° F | 950 |
| Pressure, p. s. i. g | 150 |
| Liquid hourly space velocity | 1.0 |
| Hydrogen addition, cu. ft./bbl | 3000 |
| Run length, hours | 4 |

Under these conditions the catalyst supported on the silicone carrier shows an aromatic synthesis of about 40 volume per cent while the catalyst supported on the untreated carrier shows an aromatic synthesis of only about 33 volume per cent based on the feed. The catalyst on the treated carrier contains approximately 1.7% by weight of silicone calculated as silicon.

Example II

In a preparation of another catalyst about 100 parts by weight of an alumina carrier prepared by the drying and activation of a substantially pure alumina gel is evacuated in a closed container at a temperature above about 500° F. in order to remove desorbable water and gases therefrom. Following the removal of absorbed gases, a warm stream of nitrogen gas is passed into contact with about 0.6 part by weight of methyl silicon trichloride and then into contact with the cooled carrier. The methyl silicon trichloride evaporates into the nitrogen and is adsorbed from the gas by the carrier. About 0.6 part by weight of the silicon compound are thereby deposited on the carrier. Following the adsorption of the silicon compound on the carrier, water vapor is introduced into the system which causes the hydrolysis of the silicon compound and results in the formation of a layer of silicone on the carrier surface. After heating to remove liberated hydrochloric acid and excess water the treated carrier is impregnated with molybdenum oxide in substantially the same manner as described in Example I. The catalyst is tested for hydroforming activity as described in Example I. It is found that the catalyst treated in this manner is superior to the untreated catalyst described in Example I, both with respect to catalyst activity and carbon laydown on the catalyst. The treated catalyst contains about 0.1% by weight of silicone calculated as silicon.

Example III

An additional portion of alumina carrier, which has been coated with silicone as described in Example II, is impregnated with zinc molybdate as follows: About 90 parts by weight of ammonium paramolybdate (81% MoO₃) is dissolved in a mixture of about 90 parts by weight of 28% ammonia and about 150 parts by weight of distilled water. A second solution is prepared by dissolving about 159 parts by weight of zinc nitrate hexahydrate in about 180 parts by weight of 28% ammonia and 80 parts by weight of distilled water. The zinc nitrate solution is added drop-wise to the vigorously agitated ammonium molybdate solution whereupon a clear impregnation solution of zinc molybdate is obtained. The treated carrier is immersed in the impregnation solution for a period of about one-half hour, drained, dried and activated by heating at about 1100° F. for two hours. The catalyst obtained thereby possesses high activity for producing aromatics from straight chain and branched chain aliphatic hydrocarbons. The catalyst is tested for the production of aromatics from a paraffin-rich C₇ hydrocarbon fraction at a reaction temperature of about 1050° F., a pressure of 50 p. s. i. g., a liquid hourly space velocity of 1.0, with about 1500 cu. ft. of added hydrogen per barrel of feed. Under these conditions it is found that the treated catalyst gives a greater yield of aromatics than a similar catalyst prepared on a corresponding carrier which has not been silicone-coated.

Example IV

An impregnation solution is prepared by dissolving about 142 g. of phosphomolybdic acid hydrate (assaying about 74% MoO₃) and about 3 g. of dimethyl diethoxy silane are dissolved in absolute methanol of sufficient volume to produce 700 ml. of impregnation solution. About 700 g. of an activated alumina carrier is immersed in the methanol impregnation solution for about 30 minutes, drained, dried, moistened with water, redried and calcined. The finished catalyst contains about 9.4% MoO₃ and approximately 0.05% by weight of silicone calculated as silicon.

The incorporation of the silicone-forming agent in the impregnation solution produces a treated carrier having the usual advantages of the silicone coating process. Thus, the catalyst is employed for processing a pressure distillate obtained from the coking of a high sulfur crude oil under the hydroforming conditions, viz.:

| | |
|---|---|
| Temperature, °F. | 950 |
| Pressure, p. s. i. g. | 150 |
| Liquid hourly space velocity | 1.0 |
| Hydrogen addition, cu. ft./bbl. | 3000 |
| Run length, hours | 4 |

There is obtained an improved aromatic synthesis and an improved desulfurization when compared with a similarly prepared catalyst omitting the inclusion of the dimethyl diethoxy silane.

*Example V*

In preparing a copper chromite catalyst, about 420 g. of chromic nitrate nonahydrate is dissolved in about 200 ml. of water and about 151 g. of cupric nitrate trihydrate is separately dissolved in about 150 ml. of water. The chromium and copper-containing solutions are then mixed and diluted to about 700 ml. About 700 g. of untreated activated alumina is immersed therein for about 30 minutes, drained, dried and activated by heating to about 1100° F. for 2 hours. The catalyst obtained thereby contains about 3.5% by weight of CuO and about 5.8% by weight of $Cr_2O_3$. A portion of the catalyst obtained thereby is then immersed in a solution of about 3 g. of 2,4-dibromphenyl silicon trichloride in about 800 ml. of acetone. The catalyst is soaked for about 30 minutes, drained, dried and immersed in distilled water for about 30 minutes. The wetted catalyst is again drained, dried and finally activated by heating to about 1100° F. for two hours. The finished catalyst is employed for desulfurizing a straight run gas oil boiling in the range of about 500° to 700° F. and distilled from a high sulfur crude oil. The gas oil contains about 3.0% by weight of sulfur. The low temperature desulfurization is carried out under the following reaction conditions:

| | |
|---|---|
| Temperature, °F. | 750 |
| Pressure, p. s. i. g. | 100 |
| Liquid hourly space velocity | 2.0 |
| Hydrogen addition, cu. ft./bbl. | 5000 |
| Run length, hours | 6 |

It is found that the desulfurization obtained with the silicone-coated catalyst is markedly superior to the desulfurization obtained when the uncoated portion of the same catalyst is tested. The sulfur content of the product obtained with the treated catalyst is about 0.2% by weight while the product sulfur content of the untreated catalyst is about 0.4% by weight. The treated catalyst contains about 0.01% by weight of silicone calculated as silicon.

*Example VI*

For the preparation of a cobalt molybdate impregnation solution about 1750 g. of ammonium paramolybdate (assaying about 81% $MoO_3$) is dissolved in a mixture of 3500 ml. of concentrated 28% ammonia and 1800 ml. of water. A second solution is prepared by dissolving about 1164 g. of cobalt nitrate hexahydrate in water and diluting the resulting mixture to a volume of 1 liter. The cobalt nitrate solution is then added drop-wise to the ammoniacal ammonium molybdate during the course of about 1 hour. The ammoniacal ammonium molybdate solution is vigorously agitated during the addition. About 6000 g. of a coprecipitated alumina-silica gel containing substantially 95% by weight of $Al_2O_3$ and 5% by weight of $SiO_2$ is immersed therein for about one-half hour. The carrier from the impregnation step is drained, dried and activated by heating at about 1100° F. for two hours. The finished catalyst analyzes about 9.0% by weight of $MoO_3$ and 2.1% by weight of CoO. A portion of the supported cobalt molybdate catalyst is then immersed in a solution prepared by dissolving about 5 g. of diphenyl dichloro silane in about 800 ml. of acetone. The catalyst is soaked in the acetone solution for about one-half hour, drained, dried and then immersed in distilled water for about one-half hour. The wetted catalyst is drained, dried and activated by heating to about 1100° F. for two hours. The finished catalyst contains roughly 0.03% by weight of silicone calculated as silicon.

The treated and untreated catalysts are compared for desulfurizing the high sulfur straight run gas oil of the preceding example under the conditions described therein. Under these test conditions it is found that the desulfurization is substantially improved by the treating process and the carbon deposition is decreased as a result thereof. The product sulfur content for the treated catalyst is about 0.15% by weight while the untreated catalyst gives a product containing about 0.25% by weight of sulfur.

*Example VII*

About 6558 g. of aluminum nitrate nonahydrate are dissolved in about 15 liters of distilled water and 1 liter of concentrated 28% ammonia is added thereto. About 170 g. of ammonium metavanadate is dissolved in about 900 ml. of 8% ammonium sulfide solution. The vanadium-containing solution is then poured into the aluminum nitrate solution and about 2330 ml. of 28% concentrated ammonia is added to the solution while the latter is vigorously agitated. The mixture is filtered, dried and activated by heating to 1100° F. for 2 hours in a nitrogen atmosphere. The finished catalyst contains about 11.0% of vanadium calculated as $V_2O_5$ and about 1.3% by weight of combined sulfur.

About 200 g. of the catalyst so prepared is immersed in a solution prepared by dissolving 4 g. of cyclohexyl silicon trichloride in about 200 ml. of methyl ethyl ketone. After soaking therein for about one-half hour the catalyst is removed, the methyl ethyl ketone is evaporated therefrom, and the dried catalyst is immersed in distilled water for about one-half hour. The wetted catalyst is drained, dried and activated by heating to 1100° F. for two hours. The treated catalyst contains roughly 0.1% by weight of silicone calculated as silicon. The treated catalyst is compared with a portion of the untreated catalyst for hydroforming a high sulfur pressure distillate containing about 2.0% by weight of sulfur. The results obtained show that the treating improves the desulfurization and decreases carbon laydown while at the same time the make gas produced during the reaction has a higher hydrogen content. Commercially the make gas is employed as a recycle hydrogen stream in this type of process.

*Example VIII*

A comercial 40–100 mesh silica gel, adsorption grade, is coated with silicone as follows: A solution of about 25 g. of diphenyl silicon dichloride is dissolved in about 500 g. of acetone. About 400 g. of the silica gel is immersed therein for a period of about one-half hour, after which the wetted silica gel is drained and dried at about 200° F. Following an overnight drying, the silica gel is immersed in water for about 20 minutes, drained and again dried by heating at 200° F. overnight. The treated gel is estimated to contain about 0.25% by weight of silicone calculated as silicon. The thus treated silica gel is compared with an untreated silica gel for separating hydrocarbons by adsorption.

Portions of the treated and untreated silica gels are tested by percolating a mixture containing about 50% benzene and 50% methyl cyclopentane by volume through comparable beds. It is found that the separation of the benzene by adsorption on the gel is considerably sharper in the case of the treated gel than in the case of the untreated gel.

Additional experiments show that the specificity of the treated gel for the adsorption of benzene from mixtures of benzene and methyl cyclopentane may be continuously altered by varying the weight percentage of silicone deposited on the adsorbent surface.

In the foregoing description of this invention it is apparent that the silicone formed in the presence of the contacting material is intimately bonded thereto and will not wash away and is generally resistant to oxidation during regeneration with air. Particularly in the case of the inorganic oxide supports and perhaps in other cases, it is believed that chemical bonds may be formed between the silicon atoms of the silicone and the oxygen or metallic atoms of the support during the dehydration of the hydrolytic products from the hydrolysis of the silicone-forming agent.

The solid contacts of this invention are characterized by their higher degree of oil wettability, viz., their organophilic nature. The use of organophilic contacts of this invention are especially useful for contacting hydrocarbons. An improved efficiency for contacting hydrogen in the presence of or even in the absence of hydrocarbons is obtained with the organophilic solid contacts of this invention.

The term "particle form" is employed in the following claims to denote the state of subdivision of the solid contacts of this invention. Such contacts may be powders, granules, small tablets, pills, beads, micro-beads, and the like. "Particle form" therefore denotes classes of substances which are seldom larger than 1.0 inch in diameter and are generally not larger than about 0.5 inch or less. The particles generally approximate spheres or cylinders but may of course assume other shapes.

The term "fluid" is employed to denote both liquids and gases. "Fluid hydrocarbons" denotes liquid and/or gaseous hydrocarbons.

The foregoing disclosure of this invention is not to be considered as limiting since many variations may be made by those skilled in the art without departing from the scope or spirit of the following claims.

I claim:

1. A particle-form adsorbent catalytic contacting material stable at temperatures in excess of 500° F., comprising (1) a major proportion of activated oxide selected from the group consisting of silica-gel, activated alumina and mixtures thereof, (2) a minor proportion, between about 5% and 25% by weight, of a catalytic agent selected from the class consisting of the oxides and sulfides of transitional metals having an atomic number between 22 and 42, and (3) an intimately bonded coating of an organophilic silicone, said silicone coating having been formed in situ by adsorbing onto the active surface of said activated oxide a monomeric silicone precursor having the formula:

wherein X is a hydrolyzable group, $R_1$ is a non-hydrolyzable hydrocarbon radical bonded to Si through a carbon atom, and $R_2$ and $R_3$ are selected from the class consisting of hydrolyzable groups and non-hydrolyzable hydrocarbon radicals bonded to Si through a carbon atom, then hydrolyzing the adsorbed silicone-precursor to form an adsorbent substrate containing intimately bonded silicone in amounts corresponding to between about 0.001% and 5% by weight of silicon, relative to the final catalyst composition.

2. A catalytic contacting material as defined in claim 1 wherein said catalytic agent is molybdenum oxide.

3. A catalytic contacting material as defined in claim 1 wherein said catalytic agent is cobalt oxide plus molybdenum oxide.

4. A catalytic contacting material as defined in claim 1 wherein said catalytic agent is vanadium oxide.

5. A catalytic contacting material as defined in claim 1 wherein said catalytic agent is copper oxide plus chromium oxide.

6. A catalytic contacting material as defined in claim 1 wherein said catalytic agent is zinc oxide plus molybdenum oxide.

7. A process for the catalytic conversion of a mineral oil distillate, which comprises subjecting said distillate to a temperature between about 600° F. and 1200° F. in the presence of hydrogen and a particle-form adsorbent catalytic contacting material stable at temperatures in excess of 500° F., comprising (1) a major proportion of activated oxide selected from the group consisting of silica-gel, activated alumina and mixtures thereof, (2) a minor proportion, between about 5% and 25% by weight, of a catalytic agent selected from the class consisting of the oxides and sulfides of transitional metals having an atomic number between 22 and 42, and (3) an intimately bonded coating of a methyl silicone, said methyl silicone coating having been formed in situ by adsorbing onto the active surface of said activated oxide a monomeric methyl silane containing at least one hydrolyzable group bonded to the silicon atom, and hydrolyzing the adsorbed methyl silane to form an adsorbent substrate containing intimately bonded methyl silicone in amounts corresponding to between about 0.001% and 5% by weight of silicon, relative to the final catalyst composition.

8. A process for the catalytic conversion of a mineral oil distillate, which comprises subjecting said distillate to a temperature between about 600° F. and 1200° F. in the presence of hydrogen and a particle-form adsorbent catalytic contacting material stable at temperatures in excess of 500° F., comprising (1) a major proportion of activated oxide selected from the group consisting of silica-gel, activated alumina and mixtures thereof, (2) a minor proportion, between about 5% and 25% by weight, of a catalytic agent selected from the class consisting of the oxides and sulfides of transitional metals having an atomic number between 22 and 42, and (3) an intimately bonded coating of a phenyl silicone, said phenyl silicone coating having been formed in situ by adsorbing onto the active surface of said activated oxide a monomeric phenyl silane containing at least one hydrolyzable group bonded to the silicon atom, and hydrolyzing the adsorbed phenyl silane to form an adsorbent substrate containing intimately bonded phenyl silicone in amounts corresponding to between about 0.001% and 5% by weight of silicon, relative to the final catalyst composition.

9. A process for the catalytic conversion of a mineral oil distillate, which comprises subjecting said distillate to a temperature between about 600° F. and 1200° F. in the presence of hydrogen and a particle-form adsorbent catalytic contacting material stable at temperatures in excess of 500° F., comprising (1) a major proportion of activated oxide selected from the group consisting of silica-gel, activated alumina and mixtures thereof, (2) a minor proportion, between about 5% and 25% by weight, of a catalytic agent selected from the class consisting of the oxides and sulfides of transitional metals having an atomic number between 22 and 42, and (3) an intimately bonded coating of a cyclohexyl silicone, said cyclohexyl silicone coating having been formed in situ by adsorbing onto the active surface of said activated oxide a monomeric cyclohexyl silane containing at least one hydrolyzable group bonded to the silicon atom, and hydrolyzing the adsorbed cyclohexyl silane to form an adsorbent substrate containing intimately bonded cyclohexyl silcone in amounts corresponding to between about 0.001% and 5% by weight of silicon, relative to the final catalyst composition.

(References on following page)

References Cited in the file of this patent

UNITED STATES PATENTS

| | | |
|---|---|---|
| 2,280,812 | Ellis | Apr. 28, 1942 |
| 2,400,446 | Veltman | May 14, 1946 |
| 2,400,465 | Marisic | May 14, 1946 |
| 2,441,214 | Thomas et al. | May 11, 1948 |
| 2,437,532 | Huffman | Mar. 9, 1948 |
| 2,470,202 | Wickenden | May 17, 1949 |
| 2,472,832 | Hunter et al. | June 14, 1949 |
| 2,477,671 | Warburton | Aug. 2, 1949 |
| 2,481,841 | Hemminger | Sept. 13, 1949 |
| 2,493,896 | Pardee et al. | Jan. 12, 1950 |
| 2,525,818 | Mahan | Oct. 17, 1950 |
| 2,535,082 | Mahan | Dec. 26, 1950 |
| 2,556,722 | Hersberger | June 12, 1951 |
| 2,579,123 | Pardee et al. | Dec. 18, 1951 |
| 2,614,135 | Hirschler | Oct. 14, 1952 |
| 2,618,586 | Hendel | Nov. 18, 1952 |
| 2,668,151 | Pedlow et al. | Feb. 2, 1954 |

OTHER REFERENCES

Brimley et al.: Practical Chromatography, 1954, pp. 51, 63, Reinhold, N. Y.